United States Patent
Lee

(10) Patent No.: US 12,493,594 B2
(45) Date of Patent: Dec. 9, 2025

(54) METHODS AND SYSTEMS FOR CHANGING A DATABASE SCHEMA

(71) Applicant: ENGYN PTY LTD, Sydney (AU)

(72) Inventor: Minh Lee, Sydney (AU)

(73) Assignee: ENGYN PTY LTD, Sydney (AU)

( * ) Notice: Subject to any disclaimer, the term of this patent is extended or adjusted under 35 U.S.C. 154(b) by 0 days.

(21) Appl. No.: 18/816,235

(22) Filed: Aug. 27, 2024

(65) Prior Publication Data

US 2025/0077494 A1 Mar. 6, 2025

(30) Foreign Application Priority Data

Aug. 29, 2023 (AU) ................................ 2023902776

(51) Int. Cl.
*G06F 16/21* (2019.01)
*G06F 16/23* (2019.01)

(52) U.S. Cl.
CPC .......... *G06F 16/219* (2019.01); *G06F 16/211* (2019.01); *G06F 16/2358* (2019.01)

(58) Field of Classification Search
CPC .. G06F 16/219; G06F 16/211; G06F 16/2358; G06F 16/213
USPC ......................................................... 707/609
See application file for complete search history.

(56) References Cited

U.S. PATENT DOCUMENTS

| | | |
|---|---|---|
| 5,794,030 A | 8/1998 | Morsi |
| 6,216,136 B1 | 4/2001 | Ronstroem |
| 6,216,137 B1 | 4/2001 | Nguyen |
| 6,963,880 B1 | 11/2005 | Pingte |
| 7,543,019 B1 | 6/2009 | Cormier |
| 8,244,778 B1 | 8/2012 | Wei |
| 8,583,613 B2 | 11/2013 | Liu |
| 10,915,507 B1 | 2/2021 | Cheng |
| 10,949,404 B2 | 3/2021 | Suehs |
| 11,269,823 B1 | 3/2022 | Wilton |
| 11,625,367 B1 | 4/2023 | Cseri |
| 2002/0078063 A1* | 6/2002 | Minder ................. G06F 16/284 707/999.102 |
| 2006/0004746 A1 | 1/2006 | Angus |
| 2006/0036656 A1 | 2/2006 | Mercer |
| 2006/0136471 A1 | 6/2006 | Ge |
| 2008/0147704 A1 | 6/2008 | Godwin |

(Continued)

FOREIGN PATENT DOCUMENTS

EP 1347394 A1 9/2003

*Primary Examiner* — Cam Y T Truong
(74) *Attorney, Agent, or Firm* — Thompson Hine LLP

(57) ABSTRACT

Disclosed are a method and a system for changing a database schema. The method comprises receiving a request to make a set of changes to a first version of the database schema of a database, and creating, based on the set of changes to the first version, a conversion rule for converting data records maintained by the database between the first version and a second version of the database schema. The second version results from the application of the set of changes to the first version of the database schema. The method further comprises storing the conversion rule for retrieval when performing data operations on the data records in accordance with any database schema version in a set of supported versions comprising the first version and the second version of the database schema. Also disclosed are methods and systems for performing data operations on databases supporting multiple versions of a database schema.

12 Claims, 7 Drawing Sheets

(56) References Cited

U.S. PATENT DOCUMENTS

| | | |
|---|---|---|
| 2009/0228527 A1 | 9/2009 | Wang |
| 2010/0083053 A1* | 4/2010 | Narayanan .......... G06F 11/3684 |
| | | 714/E11.002 |
| 2016/0179841 A1 | 6/2016 | Ford |
| 2020/0387498 A1 | 12/2020 | Sundelin |

* cited by examiner

METHODS AND SYSTEMS FOR CHANGING A DATABASE SCHEMA

CROSS-REFERENCE TO RELATED APPLICATIONS

This patent application claims priority to Australian Patent Application No. 2023902776 filed Aug. 29, 2023, entitled "METHODS AND SYSTEMS FOR CHANGING A DATABASE SCHEMA," which is incorporated herein by this reference in its entirety.

TECHNICAL FIELD

The present invention relates to methods and systems for changing a database schema. The present invention further relates to methods and systems for performing data operations on databases supporting multiple versions of a database schema.

BACKGROUND

A relational database is a type of database in which data is organised and represented in a well-defined structure, typically including one or more tables, describing how different data values relate to each other. This structure is known as a relational database schema, or simply database schema. The structured design of relational databases provides certain advantages over non-relational, or NoSQL, databases, including the ability to categorise data, a lower risk of data duplication, and a simpler way of conducting queries.

It is sometimes necessary, due to changes in the requirements on a database or its applications, to change the database schema. While this is possible, it requires interrupting users' access to the database and, potentially, forces a loss of support to the users while the database schema changes are applied. In addition, the migration of data to the new database schema often needs to be managed by technical specialists.

Since the data is structured, systems that use the data can break when the schema structure is changed. This creates a loss of service in dependent systems and complicates the coordination of schema changes, especially when there are multiple third-party consumers dependent on the data schema.

Even artificial intelligence systems that would be able to decide and apply changes to database schemas autonomously are not normally authorised to do so due to the significant disruptions such changes could cause, which is a missed opportunity to achieve better efficiency and creates the challenge of coordinating schema changes across human and non-human stakeholders.

It is desired to address or ameliorate one or more disadvantages or limitations associated with the prior art, or to at least provide a useful alternative.

Any reference in this specification to prior art or matter which is said to be known is not to be taken as an acknowledgement or admission that such prior art or matter forms part of the common general knowledge in the field of invention to which this specification relates.

SUMMARY

According to an example aspect, there is provided a computer-implemented method for changing a database schema. The method comprises: receiving a request to make a set of changes to a first version of the database schema of a database; creating, based on the set of changes to the first version, a conversion rule for converting data records maintained by the database between the first version and a second version of the database schema, the second version resulting from the application of the set of changes to the first version of the database schema; and storing the conversion rule for retrieval when performing data operations on the data records in accordance with any database schema version in a set of supported versions comprising the first version and the second version of the database schema.

In certain embodiments, further comprising performing data operations on the data records in accordance with any database schema version in the set of supported versions. In certain embodiments, the set of supported versions further comprises one or more additional versions of the database schema, and the conversion rule is stored in a data structure that stores one or more additional conversion rules for converting the data records between every pair of consecutive schema versions in the set of supported versions.

In certain embodiments, the method further comprises: translating one or more of the data records to the second version of the database schema using the conversion rule; and storing the translated one or more data records in the database. In certain embodiments, the one or more data records are translated in response to receiving a request to perform a data operation in accordance with the second version on the one or more data records. In certain embodiments, the method further comprises determining a severity of the set of changes to the first version of the database schema, wherein the one or more data records are translated at a scheduled time based on the severity of the set of changes to the first version of the database schema.

In certain embodiments, the method further comprises: determining whether the set of changes to the first version of the database schema involves a potential data loss in the one or more data records; and, in response to determining the set of changes to the first version of the database schema involves a potential data loss, requesting user intervention before translating one or more of the data records to the second version of the database schema. In certain embodiments, the method further comprises: determining whether the set of changes to the first version of the database schema involves a potential data loss in the one or more data records; and, in response to determining the set of changes to the first version of the database schema involves a potential data loss, analysing the one or more data records to determine whether the set of changes to the first version of the database schema will cause an actual data loss in the one or more data records. In response to determining that the set of changes to the first version of the database scheme will not cause an actual data loss, the one or more data records are translated to the second version of the database schema without requesting user intervention.

In certain embodiments, the method further comprises: deleting the conversion rule in response to translating the data records maintained by the database to the second version of the database schema; and removing the first version of the database schema from the set of supported versions.

In certain embodiments, the first and second versions of the database schema are incompatible, and the method further comprises: creating an intermediate version of the database schema based on the set of changes to the first version of the database schema, wherein the intermediate version of the database schema is compatible with the first and second versions of the database schema; creating a first intermediary conversion rule for converting the data records between the first version and the intermediate version; creating a second intermediary conversion rule for converting the data records between the intermediate version and the second version; and storing the first and second intermediary conversion rules for retrieval when performing data operations on the data records in accordance with any database schema version in the set of supported versions, wherein the set of supported versions further comprises the intermediate version of the database schema. The conversion rule is formed by the first intermediary conversion rule and the second intermediary conversion rule in sequence.

In certain embodiments, creating the conversion rule comprises: accessing a migration stack associated with one or more of the data records conforming to the first version of the database schema; and supplementing the migration stack with a version migrator for converting the one or more data records between the first version and the second version of the database schema; wherein the version migrator comprises one or more property migrators, each property migrator being configured to map one or more properties of the one or more data records conforming to the first version of the database schema to one or more properties of the one or more data records conforming to the second version of the database schema.

In certain embodiments, the conversion rule is a first conversion rule, and the method further comprises: receiving a request to make a set of changes to the second version of the database schema; creating, based on the set of changes to the second version, a second conversion rule for converting the data records between the second version and a third version of the database schema, the third version resulting from the application of the set of changes to the second version of the database schema; and storing the second conversion rule for retrieval when performing data operations on the data records in accordance with any database schema version in the set of supported versions, wherein the set of supported versions further comprises the third version of the database schema.

According to another example aspect, there is provided a system for changing a database schema. The system comprises at least one processing system configured to: receive a request to make a set of changes to a first version of the database schema of a database; create, based on the set of changes to the first version, a conversion rule for converting data records maintained by the database between the first version and a second version of the database schema, the second version resulting from the application of the set of changes to the first version of the database schema; and store the conversion rule for retrieval when performing data operations on the data records in accordance with any database schema version in a set of supported versions comprising the first version and the second version of the database schema.

In certain embodiments, the at least one processing system is further configured to perform data operations on the data records in accordance with any database schema version in the set of supported versions. In certain embodiments, the set of supported versions further comprises one or more additional versions of the database schema, and the conversion rule is stored in a data structure that stores one or more additional conversion rules for converting the data records between every pair of consecutive schema versions in the set of supported versions.

In certain embodiments, the at least one processing system is further configured to: translate one or more of the data records to the second version of the database schema using the conversion rule; and store the translated one or more data records in the database. In certain embodiments, the one or more data records are translated in response to receiving a request to perform a data operation in accordance with the second version on the one or more data records. In certain embodiments, the at least one processing system is further configured to determine a severity of the set of changes to the first version of the database schema, wherein the one or more data records are translated at a scheduled time based on the severity of the set of changes to the first version of the database schema.

In certain embodiments, the at least one processing system is further configured to: determine whether the set of changes to the first version of the database schema involves a potential data loss in the one or more data records; and, in response to determining the set of changes to the first version of the database schema involves a potential data loss, request user intervention before translating the one or more data records to the second version of the database schema.

In certain embodiments, the at least one processing system is further configured to: determine whether the set of changes to the first version of the database schema involves a potential data loss in the one or more data records; and, in response to determining the set of changes to the first version of the database schema involves a potential data loss, analyse the one or more data records to determine whether the set of changes to the first version of the database schema will cause an actual data loss in the one or more data records. In response to determining that the set of changes to the first version of the database scheme will not cause an actual data loss, the one or more data records are translated to the second version of the database schema without requesting user intervention.

In certain embodiments, the at least one processing system is further configured to: delete the conversion rule in response to translating the data records maintained by the database to the second version of the database schema; and remove the first version of the database schema from the set of supported versions.

In certain embodiments, the first and second versions of the database schema are incompatible, and the at least one processing system is further configured to: create an intermediate version of the database schema based on the set of changes to the first version of the database schema, wherein the intermediate version of the database schema is compatible with the first and second versions of the database schema; create a first intermediary conversion rule for converting the data records between the first version and the intermediate version; create a second intermediary conversion rule for converting the data records between the intermediate version and the second version; and store the first and second intermediary conversion rules for retrieval when performing data operations on the data records in accordance with any database schema version in the set of supported versions, wherein the set of supported versions further comprises the intermediate version of the database schema. The conversion rule is formed by the first intermediary conversion rule and the second intermediary conversion rule in sequence.

In certain embodiments, to create the conversion rule, the at least one processing system is configured to: access a migration stack associated with one or more of the data records conforming to the first version of the database schema; and supplement the migration stack with a version migrator for converting the one or more data records between the first version and the second version of the database schema; wherein the version migrator comprises one or more property migrators, each property migrator being configured to map one or more properties of the one or more data records conforming to the first version of the database schema to one or more properties of the one or more data records conforming to the second version of the database schema.

In certain embodiments, the conversion rule is a first conversion rule, and the at least one processing system is further configured to: receive a request to make a set of changes to the second version of the database schema; create, based on the set of changes to the second version, a second conversion rule for converting the data records between the second version and a third version of the database schema, the third version resulting from the application of the set of changes to the second version of the database schema; and store the second conversion rule for retrieval when performing data operations on the data records in accordance with any database schema version in the set of supported versions, wherein the set of supported versions further comprises the third version of the database schema.

According to another example aspect, there is provided a computer-implemented method for querying a database. The method comprises: receiving a request to query the database, the request conforming to a first version of the database schema of the database; retrieving one or more conversion rules for converting data records managed by the database between two or more versions of the database schema; retrieving, based on the request, one or more data records managed by the database; translating the retrieved one or more data records to the first version of the database schema using the one or more conversion rules; and returning the translated data records.

According to another example aspect, there is provided a computer-implemented method for adding a new data record to a database. The method comprises: receiving a request to modify the database, the request comprising input data conforming to a first version of the database schema of the database; retrieving one or more conversion rules for converting data records managed by the database between two or more versions of the database schema; translating the input data to raw data using the one or more conversion rules; and storing the raw data in the database.

According to another example aspect, there is provided a computer-implemented method for updating an existing data record of a database. The method comprises: receiving a request to modify the database, the request comprising input data conforming to a first version of the database schema of the database; retrieving one or more conversion rules for converting data records managed by the database between two or more versions of the database schema; retrieving, based on the request, one or more data records managed by the database; translating the retrieved one or more data records to the first version of the database schema using the one or more conversion rules; modifying the translated one or more data records based on the input data; and storing the modified one or more data records in the database.

In certain embodiments, the method further comprises, prior to storing the modified one or more data records, translating the modified one or more data record to a second version of the database schema using the one or more conversion rules.

In certain embodiments, the method further comprises determining data dependencies from the one or more conversion rules; wherein retrieving the data records comprises retrieving two or more data records based on the data dependencies.

According to another example aspect, there is provided a system for querying a database. The system comprises at least one processing system configured to: receive a request to query the database, the request conforming to a first version of the database schema of the database; retrieve one or more conversion rules for converting data records managed by the database between two or more versions of the database schema; retrieve, based on the request, one or more data records managed by the database; translate the retrieved one or more data records to the first version of the database schema using the one or more conversion rules; and return the translated data records.

According to another example aspect, there is provided a system for adding a new data record to a database. The system comprises at least one processing system configured to: receive a request to modify the database, the request comprising input data conforming to a first version of the database schema of the database; retrieve one or more conversion rules for converting data records managed by the database between two or more versions of the database schema; translate the input data to raw data using the one or more conversion rules; and store the raw data in the database.

According to another example aspect, there is provided a system for updating an existing data record of a database. The system comprises at least one processing system configured to: receive a request to modify the database, the request comprising input data conforming to a first version of the database schema of the database; retrieve one or more conversion rules for converting data records managed by the database between two or more versions of the database schema; retrieve, based on the request, one or more data records managed by the database; translate the retrieved one or more data records to the first version of the database schema using the one or more conversion rules; modify the translated one or more data records based on the input data; and store the modified one or more data records in the database.

In certain embodiments, the at least one processing system is further configured to, prior to storing the modified one or more data records, translate the modified one or more data record to a second version of the database schema using the one or more conversion rules.

In certain embodiments, the at least one processing system is further configured to determine data dependencies from the one or more conversion rules, wherein to retrieve the data records the at least one processing system is configured to retrieve two or more data records based on the data dependencies.

BRIEF DESCRIPTION OF THE DRAWINGS

Some embodiments of the present invention are described below, by way of example only, with reference to the accompanying drawings, in which.

DETAILED DESCRIPTION

Figure 1:
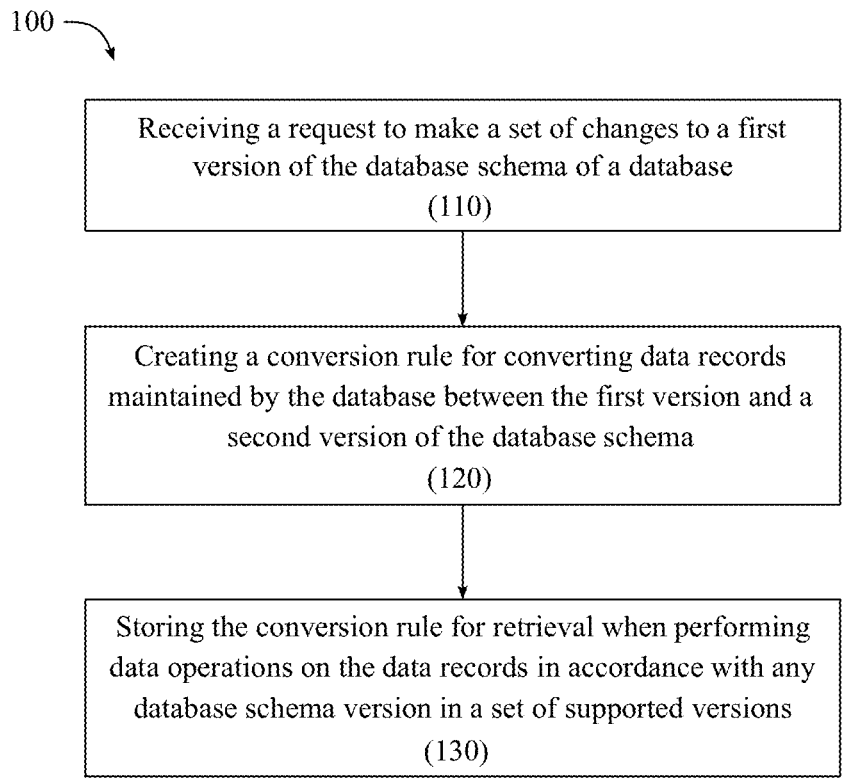
FIG. 1 shows a flowchart of an example method for changing a database schema.

Embodiments of the invention provide methods and systems for changing a database schema. Embodiments of the invention further provide methods and systems for querying a database, for adding new data records to a database, and for updating an existing record of a database, where the database supports or implements multiple versions of the database schema.

The methods and systems described herein may allow multiple different versions of a database schema to coexist in, or be concurrently supported by, the same database, so that, in some examples, schema changes can be applied without breaking existing database functionalities. Users of the database may therefore have more time to adapt to changes to the database schema and may be able to continue using the database without downtime. In some examples, the underlying storage schema evolves over version changes, so that the database can avoid becoming stuck when major changes to the database schema are made.

Users may therefore be able to perform data operations using any version of the database schema supported by the database. Data operations may include queries (i.e. operations that retrieve information from the database) and modifications (i.e. operations that create new information or that change existing information in the database). Example data operations include CRUD (create, read, update, or delete) operations.

The methods and systems described herein may allow a database schema to be changed autonomously, without human intervention. Therefore, in some examples, the methods described herein may therefore be performed by software, including artificial intelligence systems, to autonomously specify and apply schema changes without human intervention.

The data models of the databases considered herein are relational models, in which data is represented or described by relations or tables, where the rows or tuples of a table represent instances of the relation, and where the columns or fields of the table represent attributes or properties of the relation.

A data record of the database is any unit, or collection of units, of data managed, stored, or persisted by the database. A data record may be a "raw" record, representing data persisted by the database (i.e. data without a relational description), such as serialised data, or it may be a "logical" record, representing data conforming to the database schema (i.e. data with a relational description), such as a data a data structure or a data object. The database systems described herein may persist duplicates or copies of raw records in different forms or versions, for example, for supporting indexes relevant to different versions of the database schema to continue supporting searches or queries using different versions of the database schema. Logical records that are deleted automatically (e.g. by a migration process) may be preserved as raw records to provide backwards compatibility for users who may still rely on an old logical representation of the data.

FIG. 1 shows a flowchart of an example method 100 for changing a database schema.

Step 110 of method 100 comprises receiving a request to make a set of changes, including one or more changes, to a first or initial version of the database schema of a database. The initial version may be the published or current database schema, or it may be one of two or more versions of the database schema, including a version other than the published or current database schema. Data maintained by the database may conform to the initial version or to any other version of the database schema supported by the database. The request may be received by one of the users of the database. After receiving the request, the database may be locked to prevent other schema changes from being applied or published, for example, by other users.

Step 120 of method 100 comprises creating or deriving a conversion rule for converting data records maintained by the database between (i.e. to and from) the initial version and a second or new version of the database schema, which is the version resulting from the application of the set of the changes to the initial version of the database schema. The conversion rule may be created based on or derived from the set of changes to the initial version of the database schema.

In some examples, the step of creating the conversion rule comprises accessing one or more migration data structures or stacks, each of which is associated with a dataset of the database. A dataset, or relational model's structure, is an abstract representation of a relation or table, including data from a table and other tables linked to that table. A dataset may comprise one or more of the data records managed by the database. Each migration stack may be composed of an ordered or sequential arrangement of version migrator objects for converting a respective dataset between different versions of the database schema. When the database schema is changed from a first version to a second version, each migration stack may be supplemented with a version migrator object for converting the respective dataset between the first version and the second version of the database schema. Each version migrator comprises one or more property migrators configured to map, link, or relate one or more properties or columns of the respective dataset in the first version of the database schema with one or more properties of the respective dataset in the second version of the database schema.

Step 130 of method 100 comprises storing the conversion rule for retrieval when the database receives a request to perform any data operation in accordance with any version of the database schema in a set of supported versions. The set of supported versions comprises at least the initial version and the new version of the database schema. The second version of the database schema may then be published, so that the second version becomes live and operational.

In some examples, method 100 further comprises a step of performing a schema migration. The schema migration may be scheduled based on the severity or urgency of the changes to the initial version. For example, changes to tables that reference each other may require the tables to be locked for writing, in which case the schema migration may be scheduled to a system maintenance window to avoid a deadlock or circular wait queue, as may happen when processes try to access locked tables. Other example schema changes that may need to be scheduled include changes in which the new version is not backward compatible with the initial version.

In some examples, method 100 further comprises a step of performing a data migration process, in which one or more of the data records, or all the data records, are translated or converted from the initial version to the new version of the database schema, and the translated data records are stored in the database.

In some examples, data migration is performed dynamically or ad hoc, in response to user requests. For example, one or more of the data records may be translated from the initial version to the new version in response to receiving a request to perform a data operation on the one or more data records. The data operation may be a data operation in accordance with the new version of the database schema, in the format or language of the new version, such as a query requiring that data be returned in the new schema version. In other examples, data migration is performed at scheduled or specified times, deferring it as convenient.

The timing of the data migration may depend on the severity or urgency of the changes to the initial schema version. For example, if there is no urgency, data migration may be scheduled to an arbitrary future time, and dynamic data migration, which is normally not computationally intensive, is carried out instead. If the data migration requires activities that could interrupt the performance of the database system, it may be conducted during planned downtime or maintenance periods. In some examples, data migration may be deferred to a period of low computational load. In other examples, data migration is performed immediately after the creation of the conversion rule, without delay, either with low priority in the background or with high priority. For example, if the schema change does not allow the initial schema version to continue being supported, so that backward compatibility cannot be provided, the data migration may be executed immediately, even if other operations may be blocked while the data migration is being completed.

However, not all schema changes require a data migration. For example, data migration may not be necessary when a schema change only includes changes to default values of data attributes.

In some examples, prior to performing the data migration process, method 100 comprises a step of determining whether the set of changes to the initial version of the database schema involves a potential data loss, or could cause a data loss, in the one or more data records. The determination may comprise analysing the set of changes, or comparing the initial and new versions of the database schema. For example, if the set of changes includes converting a field that holds a signed integer into a field that holds an unsigned integer, negative integers in the original field will not fit into the new field, so that there is the potential for data loss (whether the data loss will occur depends on the data records). If the set of changes to the first version of the database schema will cause a potential data loss, method 100 further comprises a step of requesting user intervention before translating one or more of the data records to the second version of the database schema. User intervention may be requested, for example, by generating a message or notification about the potential data loss, which may be outputted by an I/O device, in response to which the user intervention, including user input or user instructions, may be received. The user intervention may comprise user input indicating acceptance of the potential data loss and confirmation to proceed with the data migration process, or user instructions or user specifications for conducting the data migration process, or user input indicating that the data migration process is to be interrupted or deferred to allow the user to manually adjust the data records to avoid or reduce the impact of data loss.

In some examples, if the set of changes to the first version of the database schema will cause a potential data loss, prior to requesting user intervention, method 100 further comprises a step of analysing the one or more data records to determine whether the set of changes to the first version of the database schema will cause, or will likely cause, an actual data loss in the one or more data records. For example, if the set of changes includes converting a field that holds a signed integer into a field that holds an unsigned integer, the analysis comprises searching for negative integers in the data records. User intervention is then requested only if the analysis determines that an actual data loss will cause, or will likely cause, an actual data loss. Alternatively, if the analysis determines that an actual data loss will not happen, or is unlikely to happen, or any data loss will be inconsequential, the data records are translated to the new version of the database schema without requesting user intervention, thus facilitating autonomous schema changes that can be performed by an artificial intelligence system.

Another example of the progression of method 100 in the event of a potential data loss is when the set of changes to the database schema includes converting a field with a date/time associated with a time zone to a field with a date/time not associated with a time zone. User intervention may be requested because the user might want to retain the time zone data. However, if all the data records happen to have the same time zone value, then the data loss will be deemed inconsequential, and the data migration process will proceed without being waiting for user intervention.

Method 100 may further comprise a step of performing data operations on the data records in accordance with any schema version in the set of supported schema versions. The set of supported schema versions may comprise the initial schema version, the new schema version, and, in some examples, one or more additional schema versions, such as previous schema versions of the database schema predating the initial schema version. The data operations may be performed using one or more conversion rules for converting the data records between any two schema versions. In some examples, each conversion rule converts data records between a pair of consecutive schema versions in the set of supported schema versions (e.g. to convert between the initial schema version and the previous schema version immediately preceding the initial schema version).

In some examples, method 100 further comprises a step of removing one or more schema versions from the set of supported schema versions. The removal may be initiated by a user, or it may be initiated automatically following a predetermined expiration period (e.g. when data has not been accessed in the schema version to be removed for a minimum period), or in response to any other trigger event. For example, the initial schema version may be removed from the set of supported schema versions once all the data records have been converted to the new schema version.

As part of the removal process, system parameters, such as a "minimum write version" parameter or a "minimum read version" parameter, may be updated to reflect that the removed schemas are no longer supported by the system. Users who try to submit a new data record in a schema version below the "minimum write version" parameter, or who try to read any data record in a schema below the "minimum read version" parameter may be issued an error notification. Once every data record that is still in one of the schema versions to be removed has been translated to a more recent schema version (such as the new schema version), any conversion rule for converting data records to or from the schema versions to be removed may also be removed. A whole migration stack associated with a dataset may be removed when that dataset no longer forms part of the structure of the supported database schema versions.

When the initial and new schema versions are incompatible with each other, so that data records cannot be converted between the two schema versions without a loss of information, as described below with reference to FIG. 2, or so that the initial and new schema versions cannot be concurrently supported (e.g. due to breaking changes to the initial schema version), method 100 may comprise a step of creating a third or intermediate version of the database schema, which is at least partially compatible with both the initial and the new versions, facilitating the schema and data migrations. A first intermediary, or preliminary, conversion rule, for converting the data records between the initial schema version and the intermediate schema version, may then be created, in combination with a second intermediary, or complementary, conversion rule, for converting the data records between the intermediate schema version and the new schema version. The conversion rule is formed by the sequential application of the first and second intermediary conversion rules. In some examples, two or more intermediate or auxiliary versions of the database schema may be created to facilitate migrations between the initial and new schema versions. A succession of two or more conversion rules may then be created for converting data records through the succession of two or more intermediate schema versions between the initial and new schema versions.

Figure 2:
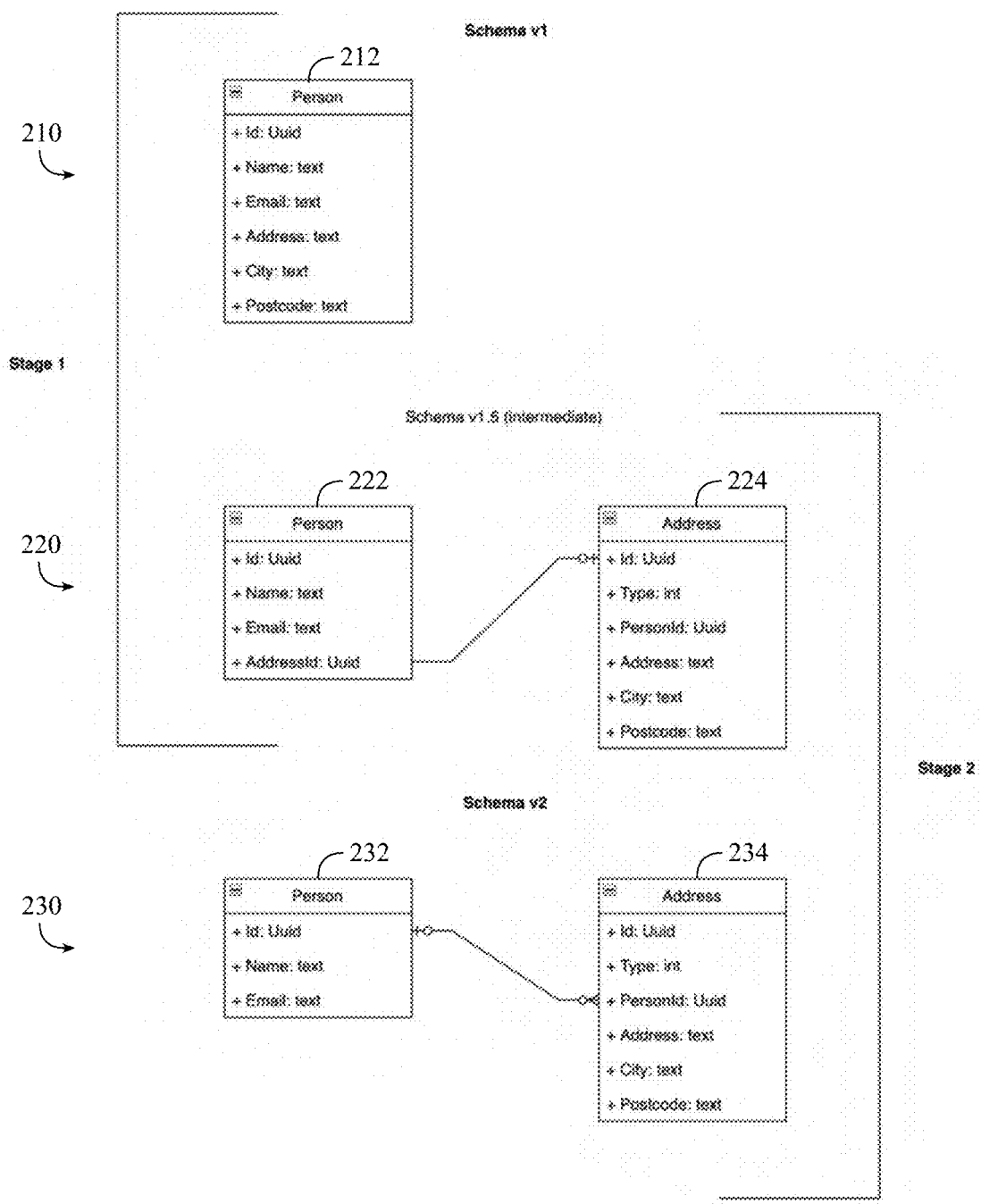
FIG. 2 shows example schema diagrams of a schema at different stages of a data operation.

FIG. 2 shows different versions of a database schema which may be utilized when changing from an initial schema 210 to a final schema 230.

Initial database schema 210 comprises a "Person" table 212 with multiple attributes, including a person key attribute, a name attribute, an email address attribute, a physical address attribute, a city attribute, and a postcode attribute.

Final database schema 230 comprises a "Person" table 232 and an "Address" table 234. Table 232 differs from table 212 in that table 232 does not include the physical address, city, and postcode attributes. These attributes are instead included in new table 234, which further includes an address key attribute, an address type attribute, and a person ID attribute. The person ID attribute contains a person key attribute, which acts as a pointer or reference to table 232.

The change from schema 210 to schema 230 introduces a "one-to-many" relationship in the data because schema 230 allows a Person record to be associated with multiple Address records (e.g. a residential address and a work address). In contrast, schema 210 only allows each Person record to be associated with a single Address record (i.e. a "one-to-one" mapping). Schema 210 is therefore unable to handle cases where two or more Address records are associated with the same Person record, and there is no direct backwards compatibility from schema 230 to schema 210. Schemas 210 and 230 are therefore incompatible or not directly compatible with each other.

Intermediate database schema 220 comprises a Person table 222 and an Address table 224. Person table 222 is similar to table 232, but also includes an Address ID reference, while Address table 224 is the same as table 234. The Address ID reference of table 222 contains an address key attribute, which acts as a pointer or reference to Table 224. Schema 220 therefore provides one-to-one mappings from a Person record to an Address record, making it compatible with schema 210, and also provides the Address relation of schema 230, making it compatible with schema 230, and allowing schema 220 to support data operations to or from either schema 210 or 230.

Schema 220 therefore facilitates a transition from schema 210 to schema 230 since it supports users reliant on either schema 210 or schema 230. At the end of a transition period during which schema 220 is the database schema, once all consumers have transitioned from schema 210 to schema 230, schema 210 can be removed from the set of supported schemas, and the database schema can be migrated to schema 230. When schema 230 is published, the schema transition may simply comprise removing the uniqueness constraint provided by the Address ID reference of table 222. This staged migration process may reduce or minimise the impact of breaking changes.

In other examples, instead of using a reference from table 222 to table 224, schema 220 may enforce a one-to-one mapping from a Person record to an Address record by adding a uniqueness constraint to the person ID attribute of table 224, so that different Address records cannot have the same person ID attribute (the Address ID attribute of table 222 would then no longer be necessary and may be removed). At the end of the transition period, once all consumers have transitioned to schema 230, the uniqueness constraint on the person ID attribute may be removed to allow the one-to-many relationship of schema 230.

Figure 3:
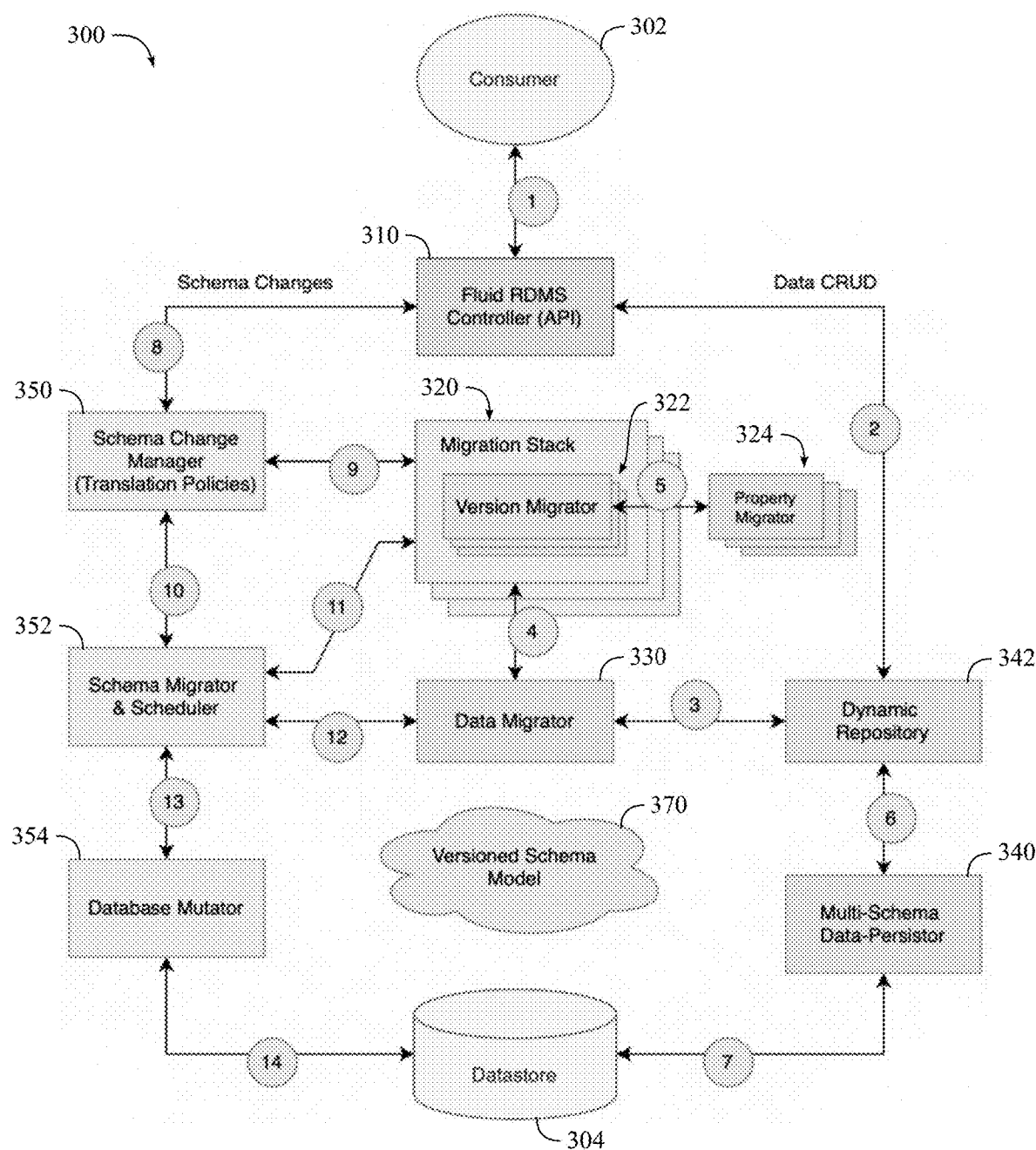
FIG. 3 shows a diagram of the architecture of an example system for changing a database schema.

FIG. 3 shows a diagram of the of the architecture of an example system 300 for changing a database schema.

System 300 comprises a relational database management system (RDMS) controller 310, which provides an interface to a consumer 302 for operating system 300. Consumer 302 is a client or user of the database system, including a system or computer application that uses system 300, for example, to perform CRUD operations on it. Consumer 302 may be internal to system 300, or it may be an external, separate system. In some examples, consumer 302 includes a user interface that displays and supports CRUD operations on the data managed by system 300, or that displays charts or any other visual representation of the data of system 300. Data managed by system 300 is stored on datastore 304, which may comprise one or more data storage devices, such as disks or tapes.

System 300 further comprises one or more migration stack modules 320, one for every data model entity. Each migration stack module 320 is configured to hold a collection of version migrator objects or entities 322 that describe the changes from one schema version to the next schema version, or from one schema version to the previous schema version. Each version migrator object 322 instructs system 300 how to change data between adjacent schema versions.

Version migrator objects 320 may further be configured to generate raw data records for new logical data records entered into system 300. To maintain indexes on older schema versions, certain fields of the raw data records may also be translated.

Each version migrator object 322 includes one or more property migrators 324. During data translation between consecutive schema versions, each property that is affected by the schema change is passed into a property migrator 324 by the respective version migrator object 322. Property migrator 324 implements a standard generic interface so that multiple different implementations of property migrator 324 can be configured to apply for a migration and can be reused across different migration stacks 320 for different data model entities. A version migrator object 322 may utilise a property migration chain, which is a sequential or linked arrangement of property migrators 324, to translate fields down to populate necessary fields, such as index fields. These additional fields may be added to a raw record to support the function of system 300.

System 300 further comprises a data migrator module 330, which is configured to translate one or more data records from one database schema version supported by system 300 to another. Data migration may be performed to update records in the database in bulk at scheduled times or in real-time in response to user requests. Data migrator module 330 interfaces with migration stack modules 320 to access the corresponding version migrator objects 322 for sequentially converting a data record through each supported schema version from a starting schema version to a target schema version. Data migrator module 330 may also be configured to convert data records between a raw record (comprising one or more data values) suitable to be written to underlying datastore 304 and a logical record for a schema version.

System 300 further comprises a multi-schema data persistor module 340, which is configured to store, query, and index data. Module 340 may support the retrieval of data in multiple schema versions at the same time. In some examples, the data is stored in different schema versions on a record-by-record basis. In other examples, the data is stored in one schema version but is migrated automatically to a newer schema version when conditions are appropriate. Module 340 may further be configured to join data from different tables to handle cases where the database schema has changed to include or separate data from other tables.

In some examples, the multi-schema data persistor module 340 comprises a conventional RDMS, such as PostgreSQL or Postgres, in which case, persisting and querying the data may comprise generating or using pre-generated SQL queries. The step of acquiring the SQL code may be conducted by module 340 or dynamic repository module 342. The SQL query may be schema-version specific because the actual database schema may be significantly different from the logical schema version. For example, columns may be duplicated with coded names to support changes over different schema versions. Due to this, and due to the potential need to encode or duplicate data into different columns, the data record to be persisted (i.e. the raw record) may be different from the data record's representation in a particular schema version (i.e. the logical record).

System 300 further comprises a schema change manager module 350, which is configured to implement translation policies. Module 350 may further be configured to score the severity of schema changes, and to schedule when a migration processing event should occur. Module 350 may also be configured to create intermediate schema versions to facilitate a smoother transition from one schema version to another.

System 300 further comprises a schema migrator and scheduler module 352, which is configured to implement the immediate or deferred migration process. During this process, module 352 may utilise the data migrator module 330 to perform necessary data migration.

System 300 further comprises a database mutator module 354, which is configured to make changes to datastore 304, including adding support for a new schema version, tracking how to remove support for a particular schema version, and executing that change when triggered to do so. Adding support for a new schema version may include adding indexes and columns, and may further include adding tables and foreign key references. Removing support for a schema version may include removing indexes, columns, tables, as well as any other configurational element that is no longer needed for any of the remaining supported schema versions. Instructions to add support for a schema version are not necessarily the reverse of instructions to remove support for that same version because adding support may rely on existing database schema features, while removing support may require removing these existing features without removing features previously added, due to the possibility that other supported schema versions may require these added features.

Database mutator module 354 may be tasked by schema migrator module 352 to create a set of instructions to add or remove support for a schema version. These instructions may be in the order in which the changes are to be applied. Depending on these instructions, the module 354 may return one or more indicators, such as flags, of the changes, which module 352 can use to score the severity of the change for scheduling when the change should be implemented. At the time of changing the database schema, module 352 may be configured to trigger module 354 to step through each change instruction and generate and then execute the corresponding action, such as SQL instructions.

Module 354 is configured to operate in a way that allows multiple versions of the database schema to coexist such that a range of sequential versions can be supported simultaneously. If datastore 304 is managed by a standard relational database such as Postgres, module 354 may be configured to perform schema changes such as adding, updating, and deleting database elements, such as indexes, columns, and tables.

The set of instructions that database mutator module 354 applies to implement a schema version support change to the database may be created by database mutator module 354, as described above, or by any other module, including schema migrator module 352. The instruction set may be created by reading the schema change configuration and creating a property delta set for that change. In some examples, the process of creating the set of instructions comprises finding the logical differences between two schema versions. A "property reference" (propertyRef) is an identifier that may be used to track the same representation of data when a configuration of a data property, such as data type, changes. By using the propertyRef identifier, the schema changes can be categorised into a schema delta set (things added, changed, and removed) that includes a collection of Property Delta Configs. The schema delta set may then be compared with the existing supported schema versions to identify PUSH or PULL migration changes to apply. For example, if in a new version of a schema a property is added and another is removed, the PUSH instruction set for adding the new schema support may only add a new column for the new property without deleting the column for the removed property because it is still required by at least one other supported schema version. When support for a previous schema version is removed and a removed property is no longer used in any newer schema versions, the PULL instruction set may include an instruction to remove the column associated with the removed property.

A Property Delta Config may comprise two lists of properties: one for input properties and one for output or target properties. Each of these lists may have zero, one, or more properties, but the two lists cannot both have zero properties. Each list is ordered by the PropertyRef identifiers to ensure correct mapping for the creation and consuming code to access the correct property. When one list has no properties, meaning that a property was deleted or added in the schema change: if a property was added, the column is to be added; or, if a property was deleted, the column is to be deleted. When both lists have the same property, each setting or configuration item is compared to establish differences, and, when the differences are found, the system determines if a new column is required or if the same column can remain: if the column can remain (usually because the change is permissive), then the changes are to be applied when the database change is executed; or, if a new column needs to be added, then a new column is to be added next to the existing one. When one list has one property and the other side has multiple, it must be determined which columns are to be added or removed. When both lists have multiple properties, new columns are to be added and the previous columns made obsolete. Depending on the property changes, the columns may have certain database settings applied such as indexes and foreign key constraints.

System 300 further comprises a dynamic repository module 342, which is configured to provide a system interface for accessing and persisting data. Depending on the version of a schema that is being queried, module 342 may be configured to construct or reuse previously compiled queries to access the data.

System 300 stores and maintains a versioned schema model 370, which is a conceptual model of how the schema is organised and a system of rules that govern how schema changes are tracked and identified. Due to the dynamic nature of system 300, most functions of RDMS controller 310 rely on the database schema to determine what action to take or what shape the data must conform to from version to version.

During operation, consumer 302 calls the application programming interface (API) of RDMS controller 310, exposing a set of functions that allow users to perform operations, such as query and update records in various supported versions for a table or data view, or to add or change the schema of the database. User requests to perform data operations are then passed by RDMS controller 310 to dynamic repository module 342, which may handle conventional data queries and CRUD operations. Alternatively, user requests to make changes to the database schema and its configuration are passed by RDMS controller 310 to schema change manager module 350.

When performing a data operation, dynamic repository module 342 utilises multi-schema data-persistor module 340 to retrieve raw query data or perform CRUD updates to the datastore 304. Multi-schema data-persistor module 340 performs query and CRUD operations on underlying datastore 304 to retrieve raw data for processing by higher level components.

When performing a schema change, dynamic repository module 342 utilises data migrator module 330 to translate the raw records into records conforming to the requested data schema version, or to translate data records into a target storage format that multi-schema data-persistor 340 can store.

Data migrator module 330 may retrieve the relevant migration stack 320 for the schema's entity from in-memory cache and use it to form a processing pipeline that migrates a record from one schema version to another. Migration stack 320 manages a sequence of version migrator objects 322. Schema changes and changes to the schema version support of entities apply the corresponding change to the collection of version migrator objects 322. Each version migrator object 322 may have one or more property migrators 324, and may be responsible for ensuring the correct property migrators 324 are available for a particular schema version increment, if required.

Schema change manager module 350 utilises migration stack 320 to determine how to coordinate the schema migration, for example, if module 350 needs to score the severity of the change and determine to what degree the migration can be deferred. This logic may rely on details of the supported schema versions, the details of which can be found in migration stack 320. When a migration plan is determined, the schema migrator and scheduler module 352 is configured to apply the change immediately, to defer the change, or to take no action. At the time when the migration is to be performed, schema migrator and scheduler module 352 may rely on the details in migration stack 320 to construct a set of instructions for database mutator module 354 to action. This information may also be required to determine what, if any, data needs to be migrated as part of the schema support change.

Data migrator module 330 may be required as part of schema migration activities in cases where a new index needs to be populated, or where the change forces a requirement that data be migrated before the new schema can be made live.

Schema migrator and scheduler module 352 then instructs database mutator module 354 about which changes need to be made to datastore 304 to support the schema changes, and module 354 applies changes to the datastore 304.

Translation policies are a set of rules or data operations that govern how data is translated from one schema to another. During schema translation, some common challenges arise including, but not limited to, the following, listed with their example policies.

One example schema change includes a meaning change, resulting in a fundamental difference in meaning of the data. This change may be treated as a different property with the same name, or one property being replaced by a different one with the same name. Unless a specific data conversion or translation script is provided, system 300 will not translate the data and treat the property as a new property with the same name, so that data is not translated and the default value is returned instead.

Another example schema change includes a data loss, as may occur, for example, due to a reduction in the allowed range of a numerical property. Migration scheduler module 352 may then analyse the existing data to determine the best course of action. For example, when the analysis of the actual data stored finds that no actual data loss would occur, data may only be kept or copied to the new property or column. When the analysis finds that the change will only affect the precision of the value (i.e. the value will be rounded up or down to a lower level of precision), the data may be kept or copied to the new property or column, and the previous data will be preserved. When the analysis finds that the change will cause data corruption, as when the change would alter the meaning of the data (e.g. as when converting a double data type to a float data type), the change will be handled as a meaning change, addressed above. User intervention might be requested on the possibility of data loss when no data loss would occur according to the actual data in the database.

Another example schema change includes a replacement to map one or more data records to a property, so that data in a table is moved into one or more columns of a table in the new schema, and the previous data records are replaced so that they are no longer available after the schema change. This change may be handled in two ways. The first way includes making the data backwards compatible using a rule or script; in this case the relationship is changed to one-to-one using an intermediate schema, with data in the related tables being converted using the rule or script, after which the new schema that changes the mappings to properties in the main table is published. The second way may be followed when the data cannot be made backwards compatible, and data updates are required before the schema can be changed. In this case, the change is considered to be creating data that has new meaning and therefore the properties will be created and made available with the expectation that these will be updated somehow to capture the new meaning. This might involve user input or some other process and can be done over time as both old and new properties will be concurrently available. Once all or the required data has been saved to the new properties, the old relationship can be removed in new version of the schema. This will expectedly cause data loss.

Another example schema change includes a fork in which data in one or more tables is copied into columns of the table in the new schema. The data records in the original tables are unchanged and still available after the schema change, and certain properties or columns in the data records are copied over to the new table.

Another example schema change includes a replacement to map a property to data records, in which data that is in columns of the table is moved to records in other tables. If the change involves mapping multiple records in one table to a single record in another table, it may not be possible for new data to be translated back to an older version of the schema. To address this issue, an intermediate schema may be used that models the change as a one-to-one mapping first which will not have the properties in the same table in the latest schema version. This allows adjustment to the new structure as backwards compatibility can be maintained. Once that intermediate schema is published the system can remove support for the older version of the schema that held the data in the same table. Once support is completely removed for the older schema version, the system can publish the intended one-to-many schema.

Another example schema change includes a fork to change a property to mapped records, in which data records that were previously in columns of a table are copied into records in other tables. When data is duplicated it means that the data represents different things so it is handled such that there is no relationship between the original properties and the new copy. The new table or records are created and then a copy process is run which, since there is no relationship, is not required to be backwards compatible.

Another example schema change includes a type conversion, in which information content remains the same but the data is stored in a different data type, such as when a number or a date-time type is converted to text. In these cases the data is parsed so that it can be changed back between the two types. If the conversion cannot be done without data loss, the change is handled like the data loss change described above.

Another example schema change includes renaming a property or column. In this case, the data is unchanged and only copied or mapped to the new field.

Another example schema change includes a change to a configuration (e.g. default value, maximum or minimum values) of a property. If the change does not risk or cause data loss, no data migration is done. Alternatively, if there is a risk of data loss, the change is handled like the data loss change described above.

Figure 4:
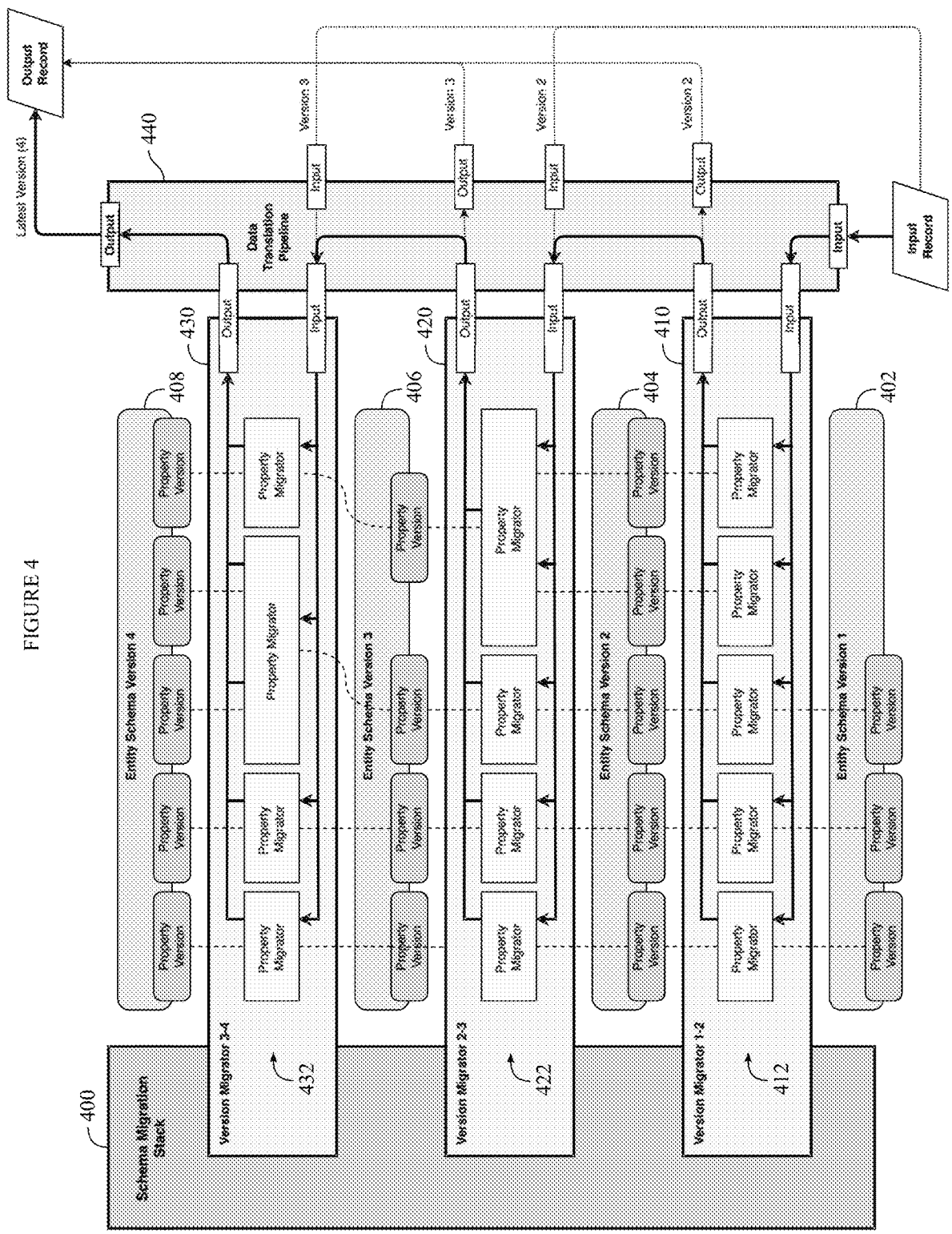
FIG. 4 shows a diagram of the architecture of a migration stack of the system of FIG. 3.

FIG. 4 shows an example migration stack module 400 of system 300. Stack module 400 comprises a first version migrator object 410 configured to convert an instance of a data model entity between a first data model entity 402 and a second data model entity 404, a second version migrator object 420 configured to convert an instance of a data model entity between second data model entity 404 and a third data model entity 406, and a third version migrator object 430 configured to convert an instance of a data model entity between third data model entity 406 and a fourth data model entity 408.

First data model entity 402 conforms to a first version of the database schema, second data model entity 404 conforms to a second version of the database schema, third data model entity 406 conforms to a third version of the database schema, and fourth data model entity 408 conforms to a fourth version of the database schema. Each of data model entities 402, 404, 406, and 408 comprises a set of properties, which are converted from one version of the data model entity to another by collections of property migrators 412, 422, and 432 held by version migrator objects 410, 420, and 430, respectively. For a given version migrator object, a data record is processed by each property migrator object until all properties of the data record have been migrated, at which point the data record is considered to be in the output schema version.

Stack module 400 holds version migrator objects 410, 420, and 430 in a sequence ordered from the earliest schema version (i.e. the first version) to the latest schema version (i.e. the fourth version). Stack module 400 may be updated with a new version migrator as part of the publication process of a new database schema version. When a new database schema version is being published, new version migrators may be added to each relevant migration stack (depending on the data model entities affected by the schema version changes), in some examples, before publishing is complete. Conversely, when support for a schema version is removed, the corresponding version migrator objects will be removed from the migration stack modules that hold them.

Each version migrator object may be created as part of publishing a new schema version (e.g. version migrator object 430 may be created as part of publishing the fourth schema version). The version migrators may be created based on the differences between consecutive schema versions, so that the changes in properties between schema version serve as the basis for mapping property migrators.

Each property migrator is configured to translate a set of one or more data fields in one supported version to another set of one or more data fields in another supported version. A property migrator may have a many-to-many interface, allowing it to receive one or more properties as inputs from an input schema version and generate multiple properties to the output schema version. Property migrators can achieve two-way, real-time migration between different schema versions, and are able to concurrently support migrations across two or more schema versions. The versions need not be consecutive versions if there are no significant changes between the two versions for those related properties or fields. Property migrators may also be used in the conversion of data records between a raw version suitable to be written to an underlying datastore and a schema version.

The property migrators are modular components that can be arranged into a processing or data translation pipeline 440. Each property migrator may comprise two pipelines: an up-conversion pipeline and a down-conversion pipeline for converting properties up or down, respectively, between schema versions. Since each pipeline component can have two chainable functions, a property migrator may use the same or different pipelines to perform the up- and down-migration functions. A property migrator may be constructed from one or more pipeline stages such that the input and output parameter signatures match the input and output properties of the required migration.

When a new schema version is being published, the type of property changes may be used to map or create a set of default property migrator pipelines. Depending on the type and extent of changes, default property migrators may be available to use without any further configuration from the user. In other examples, input from the user is used to set up a property migration pipeline.

A sequential arrangement of property migrators, called a property migration chain, therefore allows a property to be migrated across supported property versions. Each chain represents a property that has changed over time and is configured to migrate a specific property up or down, for example, to populate an indexed field. Each property migrator in the chain may also be mapped to version migrator objects in migration stack module 400.

Raw data may include additional data to support features of the platform, including multiple concurrent schema support.

In some examples, the additional data comprises a data version number which tracks user-made changes to a data record, instead of system-made changes due to, for example, data migration. The data version number can be used to determine when exact copies of data need to be retained to ensure exact support for older schema versions.

In some examples, the additional data comprises existing or previous indexes, which may require indexed columns on older schema versions to be continually populated and updated. When a new record is saved, the relevant fields may be converted to the older schema version, and the indexed columns may be populated to allow queries against the older schema version to return the new record as well.

In some examples, the additional data comprises pre-converted values, or "retained values", corresponding to data that is not supported or is not part of a new schema version. To prevent a loss of backwards compatibility, multiple versions of a record may be retained: one conforming to the new schema version and one or more conforming to the schema versions that are no longer compatible (but are still supported by the database).

In some examples, the additional data comprises aggregatable or groupable fields, to support reporting functions which may need to aggregate data or support group-by functions of queries. In these cases it may be necessary for the additional data to have its own column. When the data only pertains to an older schema, the values in this column may be translated and populated to maintain the expected functionality.

Figure 5:
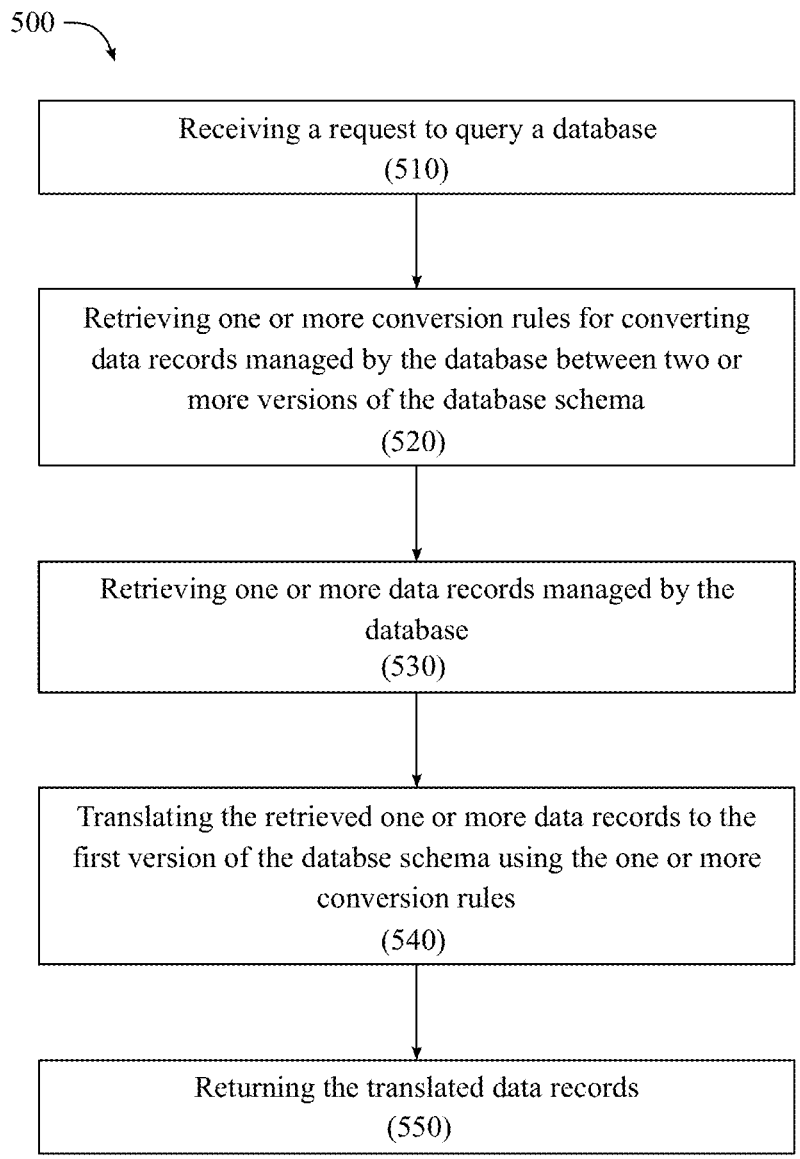
FIG. 5 shows a flowchart of an example method for querying a database.

FIG. 5 shows a flowchart of an example method 500 for querying, or reading data from, a database.

Step 510 of method 500 comprises receiving a request to query the database. The request conforms to a first version of the database schema of the database, which may support one or more different versions of the database schema. If the first version of the database schema is the current or published version of the database schema, and if the database supports no other version of the database schema, the translation steps that follow can be omitted.

Step 520 of method 500 comprises retrieving or accessing one or more conversion rules for converting data records between two or more versions of the database schema. In some examples, a data structure, such as a migration stack, holding the one or more conversion rules may be retrieved. The data structure may be the data structure associated with the data model entity pertinent to the request. In some examples, the data structure is retrieved from a cache memory of the processing system performing method 500. In other examples, the data structure is retrieved from any other memory or data storage device.

Step 530 of method 500 comprises retrieving or accessing, based on the request, one or more data records managed by the database. The retrieved data records may be raw records. Prior to retrieving the data records, data dependencies may be determined from the conversion rules, so that any dependent or interdependent data records can also be retrieved. For example, if the query relates to data in more than one table, data records of all the required tables may be retrieved and, in some examples, joined or combined.

Step 540 of method 500 comprises translating the retrieved one or more data records to the first version of the database schema using the one or more conversion rules. For each schema version change in the translation, the relevant version migrator may be retrieved from the data migration stack. The raw data record may then be passed into the version migrator to migrate to a next or previous schema version. For each property migrator in the version migrator, the source properties are passed into or subjected to the migration function of the property migrator, and the output of the property migrator is set in the output record as the target properties, repeating until all property migrators have completed their processing. The output record is then fed back in as the input to the next version migrator's migration function. This process is repeated until the data record is output with the desired schema version.

In some examples, if the data records are translated to a more recent or to the current version of the database schema, the translated data records are written back, or queued to be written back, into the database in the updated schema version.

Step 550 of method 500 comprises returning the translated data records. In some examples, the translated data records are returned over the API.

In one example, in which a query is received that uses the current schema version of the database, and the query relates to a single table, the raw data record is retrieved from the database. If the raw data record is found to be in the current schema version, no data migration steps are performed, and the record is only converted to a form suitable to be sent across an API, before being sent.

In another example, in which a query is received that uses a previous, supported schema version of the database, it may be found that the query relates to data separated into multiple tables. The data records from all the relevant tables are then retrieved, and the relevant version migrators from the migration stack are retrieved. The data is then migrated "down" the stack, from a more recent to an earlier schema version. The data retrieved from separate tables can then be used to perform the migration steps requiring data from separate tables.

Since changes to the database schema may break existing queries, the version of the database schema to which the query relates may be stored so as to map a query version to the appropriate version of the database schema.

For queries that are stored and managed by the system (i.e. internally managed queries), identifiers of the input and target versions of the database schema may be stored. If the query relates to the current or only version of the database schema, the target version identifier may be left empty. Since not all changes to the database schema invalidate an existing query, the query does not need to be updated for every change to the database schema. The system may instead update and invalidate an existing query when the query no longer maps to a supported version of the database schema.

For queries that are received via a request, such as from an API call from an external component or system (i.e. external queries), the request should use the latest version of the database schema with which the query is compatible (the target schema version). If the system no longer supports that version, the system can check if the query is still valid for a later supported version of the database schema, and, if so, return the query results with a warning response letting the caller know their target schema version is no longer supported and should be updated. An example of a query that relates to a version of the database schema that is no longer supported but that can still be answered is a query that seeks to access table properties or columns that have not changed in the supported schema versions relative to the schema version used by the query.

Figure 6:
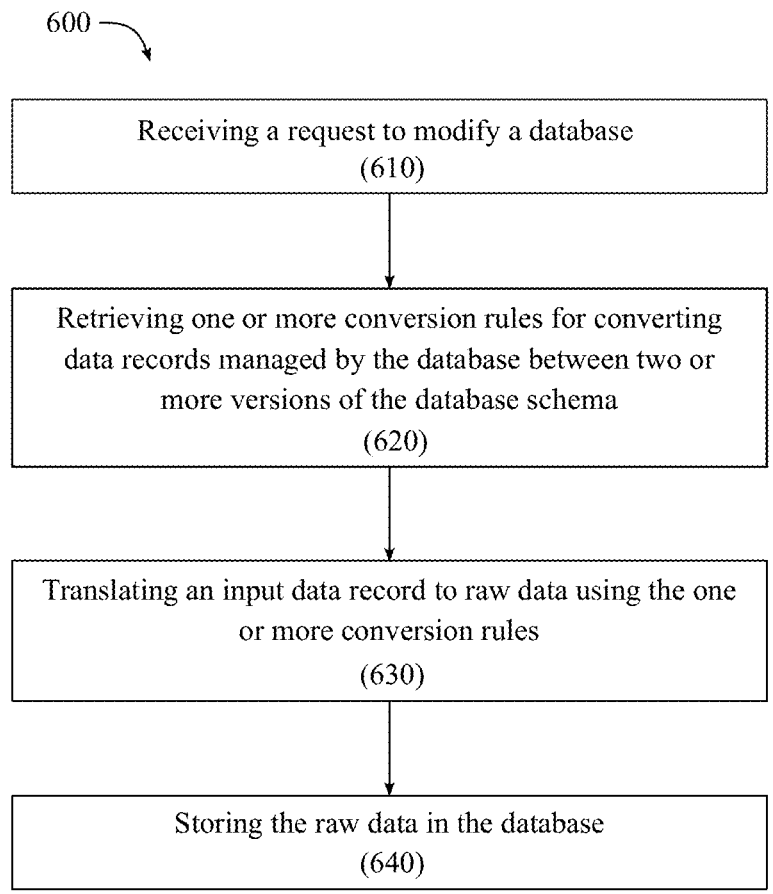
FIG. 6 shows a flowchart of an example method for adding a new data record to a database.

FIG. 6 shows a flowchart of an example method 600 for adding or writing a new data record to a database.

Step 610 of method 600 comprises receiving a request to modify the database. The request comprises input data conforming to a first version of the database schema of the database, which may support one or more different versions of the database schema. If the first version of the database schema is the current or published version of the database schema, and if the database supports no other version of the database schema, the translation steps that follow can be omitted.

Step 620 of method 600 comprises retrieving or accessing one or more conversion rules for converting data records between two or more versions of the database schema. In some examples, a data structure, such as a migration stack, holding the one or more conversion rules may be retrieved. The data structure may be the data structure associated with the data model entity pertinent to the request. In some examples, the data structure is retrieved from a cache memory of the processing system performing method 600. In other examples, the data structure is retrieved from any other memory or data storage device.

Step 630 of method 600 comprises translating the input data to raw data using the one or more conversion rules. The input data may be converted to a raw record by applying the conversion rules to create values for any necessary fields to be populated, including default values and translated values to support required indexed fields used to response to queries using older versions of the supported schema. The conversion rules specify how the input data is to be organised in raw storage. They also specify what other versions, if any, of the database schema are supported, and whether conversions need to take place. For examples, indexed columns cannot be versioned on a record-by-record basis, so, if there is a schema change, a duplicate column that tracks both versions may need to be added. New data records added need to populate these columns, so the database schema details may be needed when adding a new record.

Step 640 of method 600 comprises storing or writing the raw data to the database. Confirmation of the successful completion of the write operation may then be returned over the API.

Method 600 may comprise a further step of translating the updated existing data record to a third, or further target schema, using the data migration stack, the further target schema being another one of two or more database schemas supported by the database. For example, if the schema of the existing data record is not the current schema of the database, the updated existing data record may be converted to the current schema.

In one example, in which a request is received to write a new data record using the current schema version of the database. Although the data record is in the current version of the database schema, migration might still be necessary as any older supported version of the database schema may require an index field to be populated to allow queries against the older version to function correctly. Therefore, the input data record may be passed into the migration stack to populate the necessary fields to support data operations using older supported versions of the database schema. The translated raw record is then written to the database. In some examples, part of the new data record is duplicated into another supported schema version, primarily for supporting indexes so that previous schema versions can retain the ability to be queried and have those queries return records stored in the new schema.

Figure 7:
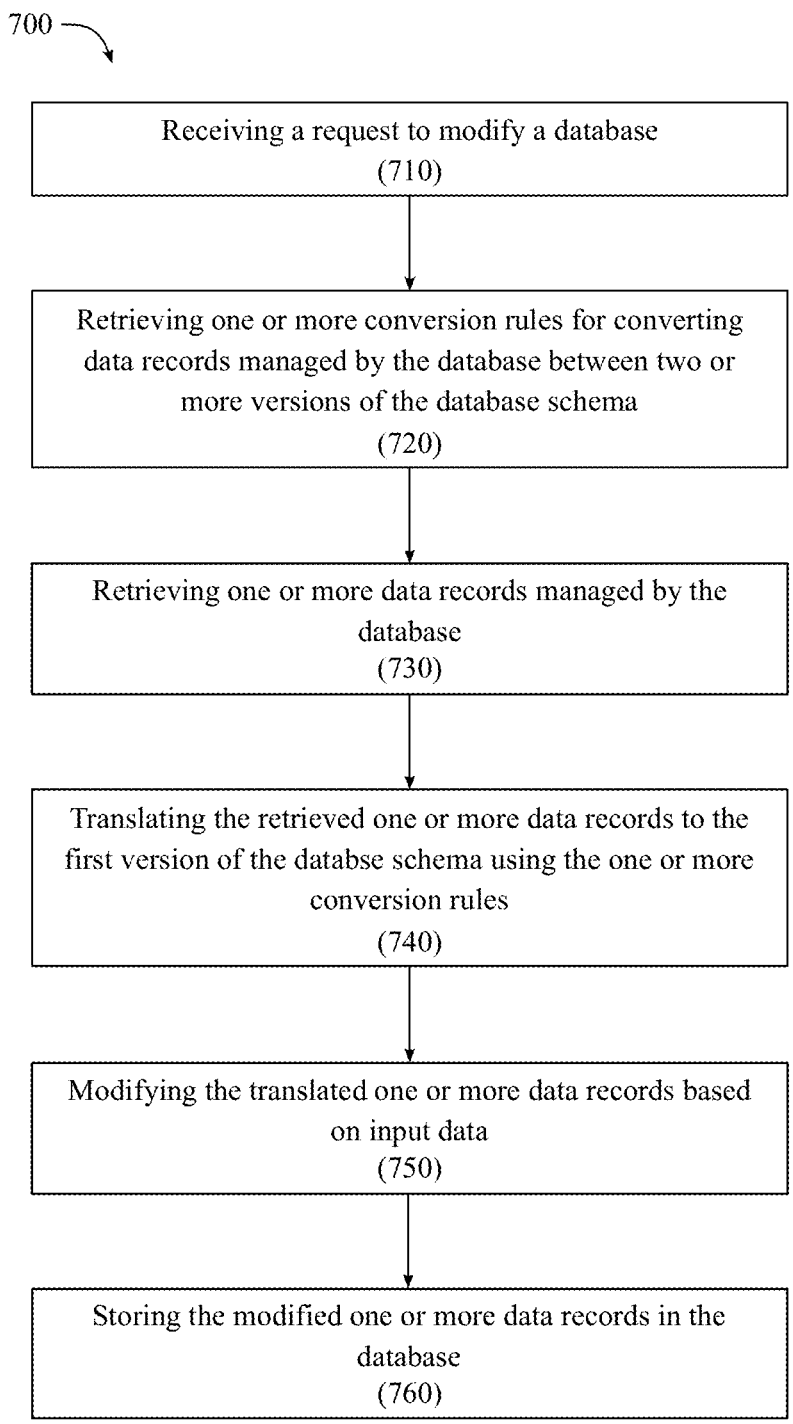
FIG. 7 shows a flowchart of an example method for updating an existing record of a database.

FIG. 7 shows a flowchart of an example method 700 for updating or changing an existing data record of a database.

Step 710 of method 700 comprises receiving a request to modify the database. The request comprises input data conforming to a first version of the database schema of the database, which may support one or more different versions of the database schema. The input data may comprise new data intended to supplement or replace current data of the data record, or instructions for modifying the current data of the data record. If the first version of the database schema is the current or published version of the database schema, and if the database supports no other version of the database schema, the translation steps that follow can be omitted.

Step 720 of method 700 comprises retrieving or accessing one or more conversion rules for converting data records between two or more versions of the database schema. In some examples, a data structure, such as a migration stack, holding the one or more conversion rules may be retrieved. The data structure may be the data structure associated with the data model entity pertinent to the request. In some examples, the data structure is retrieved from a cache memory of the processing system performing method 700. In other examples, the data structure is retrieved from any other memory or data storage device.

Step 730 of method 700 comprises retrieving, based on the request, one or more data records managed by the database. The retrieved data records may be raw records. Prior to retrieving the data records, data dependencies may be determined from the conversion rules, so that any dependent or interdependent data records can also be retrieved. For example, if the query relates to data in more than one table, data records of all the required tables may be retrieved and, in some examples, joined or combined.

Step 740 of method 700 comprises translating the retrieved one or more data records to the first version of the database schema using the one or more conversion rules. For each schema version change in the translation, the relevant version migrator may be retrieved from the data migration stack. The raw data record may then be passed into the version migrator to migrate to a next or previous schema version. For each property migrator in the version migrator, the source properties are passed into the migration function of the property migrator, and the output of the property migrator is set in the output record as the target properties, repeating until all property migrators have completed their processing. The output record is then fed back in as the input to the next version migrator's migration function. This process is repeated until the data record is output with the desired schema version.

Step 750 of method 700 comprises modifying the translated one or more data records based on the input data. In some examples, the input data is copied into the translated data records.

Step 760 of method 700 comprises storing or writing the modified one or more data records in the database. Confirmation of the successful completion of the write operation may then be returned over the API. In some examples, prior to storing the modified one or more data records, method 700 further comprises a step of translating the modified one or more data record to a second version, such as the current or published version, of the database schema using the one or more conversion rules.

In another example, a request may be received to update an existing data record in an older version of the schemas supported by the database in which the data is stored across two tables because an intermediate schema is being used. The system detects that records span multiple tables, so these records are retrieved using a join query. The input data record is then translated to the same schema version of the existing data record. The input data is then applied to the existing records to update the relevant values. The updated records are then updated to the latest schema version before being saved.

Figure 8:
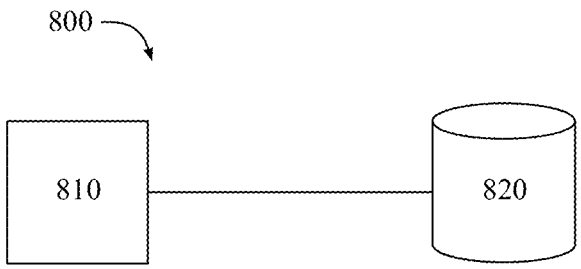
FIG. 8 shows a block diagram of an example system for changing a database schema.

FIG. 8 shows an example system 800 for changing a schema of a database. System 800 comprises a processing system 810 and a data store or repository 820 communicatively coupled to processing system 810. In other examples, system 800 comprises more than one processing system. Data store 820 may be any data storage device configured to store or hold data records of the database, and may include a hard drive or a virtual or distributed storage system.

Processing system 810 is configured to receive a request to make a set of changes to a first version of the database schema of a database, and to create, based on the set of changes to the first version, a conversion rule for converting data records maintained by the database between the first version and a second version of the database schema, the second version resulting from the application of the set of changes to the first version of the database schema. Processing system 810 is further configured to store the conversion rule for retrieval when performing data operations on the data records in accordance with any database schema version in a set of supported versions comprising the first version and the second version of the database schema.

System 800 may also be a system for querying, or reading data from, a database in accordance with method 500; a system for adding or writing a new data record to a database in accordance with method 600; or a system for updating or changing an existing data record of a database in accordance with method 700. Processing system 810 may be configured to perform any of the methods described herein.

The term "processing system" may refer to any electronic processing device or system, or computing device or system, or combination thereof (e.g. computers, web servers, smart phones, laptops, microcontrollers, etc.), and may include a distributed computing system, such as a cloud computing system. In general, processing/computing systems may include one or more processors (e.g. CPUs, GPUs), memory components, and input/output interfaces, connected by at least one bus. They may further include input/output devices (e.g. keyboard, displays, touchscreens, etc.). Processing or computing systems may be configured to execute instructions and process data, or perform operations on data, stored in memory. Processing or computing systems may be programmable or configurable through software.

The subject matter presented herein may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Optional embodiments may also be said to broadly include the parts, elements, steps and/or features referred to or indicated herein, individually or in any combination of two or more of the parts, elements, steps and/or features, and where specific integers are mentioned which have known equivalents in the art to which the invention relates, such known equivalents are deemed to be incorporated herein as if individually set forth.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The invention claimed is:

1. A computer-implemented method for changing a database schema, the method comprising:
   receiving, by a computing system, a request to make a set of changes to a first version of the database schema of a database;
   in response to the receiving of the request:
   creating, by a computer system, based on the set of changes to the first version of the database schema of the database, a conversion rule for converting data records maintained by the database between the first version and a second version of the database schema, the second version resulting from an application of the set of changes to the first version of the database schema, wherein the creating the conversion rule comprises:
      accessing, in a storage system, a migration stack associated with one or more data records of the data records conforming to the first version of the database schema; and
      supplementing the migration stack with a version migrator for converting the one or more data records between the first version and the second version of the database schema, wherein the version migrator comprises one or more property migrators to map one or more properties of the one or more data records conforming to the first version of the database schema to one or more properties of the one or more data records conforming to the second version of the database schema;
   storing in the storage system, by the computer system, the conversion rule for retrieval when performing data operations on the data records in accordance with any database schema version in a set of supported versions comprising the first version and the second version of the database schema;
   determining, by the computer system, whether the set of changes to the first version of the database schema involves a potential data loss in the one or more data records; and
   in response to determining that the set of changes to the first version of the database scheme will not cause a potential data loss, translating without user intervention, by the computer system, one or more of the data records of the first version of the database schema to the second version of the database schema using the conversion rule.

2. The method of claim 1, further comprising performing data operations on the data records in accordance with any database schema version in the set of supported versions.

3. The method of claim 2, wherein the set of supported versions further comprises one or more additional versions of the database schema, and wherein the conversion rule is stored in a data structure that stores one or more additional conversion rules for converting the data records between every pair of consecutive schema versions in the set of supported versions.

4. The method of claim 1, wherein the one or more data records are translated in response to receiving a request to perform a data operation in accordance with the second version on the one or more data records.

5. The method of claim 1, further comprising:
determining a severity of the set of changes to the first version of the database schema;
wherein the one or more data records are translated at a scheduled time based on the severity of the set of changes to the first version of the database schema.

6. The method of claim 1, further comprising:
in response to determining the set of changes to the first version of the database schema involves a potential data loss, requesting user intervention before translating the one or more data records to the second version of the database schema.

7. The method of claim 1, further comprising:
determining whether the set of changes to the first version of the database schema involves a potential data loss in the one or more data records; and,
in response to determining the set of changes to the first version of the database schema involves a potential data loss, analysing the one or more data records to determine whether the set of changes to the first version of the database schema will cause an actual data loss in the one or more data records;
wherein, in response to determining that the set of changes to the first version of the database scheme will not cause an actual data loss, the one or more data records are translated to the second version of the database schema without requesting user intervention.

8. The method of claim 1, further comprising:
deleting the conversion rule in response to translating the data records maintained by the database to the second version of the database schema; and
removing the first version of the database schema from the set of supported versions.

9. The method of claim 1, wherein the first and second versions of the database schema are incompatible, the method further comprising:
creating an intermediate version of the database schema based on the set of changes to the first version of the database schema, wherein the intermediate version of the database schema is compatible with the first and second versions of the database schema;
creating a first intermediary conversion rule for converting the data records between the first version and the intermediate version;
creating a second intermediary conversion rule for converting the data records between the intermediate version and the second version; and
storing the first and second intermediary conversion rules for retrieval when performing data operations on the data records in accordance with any database schema version in the set of supported versions, wherein the set of supported versions further comprises the intermediate version of the database schema;
wherein the conversion rule is formed by the first intermediary conversion rule and the second intermediary conversion rule in sequence.

10. The method of claim 1, wherein the conversion rule is a first conversion rule, the method further comprising:
receiving a request to make a set of changes to the second version of the database schema;
creating, based on the set of changes to the second version, a second conversion rule for converting the data records between the second version and a third version of the database schema, the third version resulting from the application of the set of changes to the second version of the database schema; and
storing the second conversion rule for retrieval when performing data operations on the data records in accordance with any database schema version in the set of supported versions, wherein the set of supported versions further comprises the third version of the database schema.

11. A system for changing a database schema, the system comprising:
one or more processors; and
a memory storing instructions that are executed by one or more processors to perform operations comprising:
receiving a request to make a set of changes to a first version of the database schema of a database;
in response to the receiving of the request:
creating based on the set of changes to the first version of the database schema of the database, a conversion rule for converting data records maintained by the database between the first version and a second version of the database schema, the second version resulting from an application of the set of changes to the first version of the database schema, wherein the creating the conversion rule comprises:
accessing, in a storage system, a migration stack associated with one or more data records of the data records conforming to the first version of the database schema; and
supplementing the migration stack with a version migrator for converting the one or more data records between the first version and the second version of the database schema, wherein the version migrator comprises one or more property migrators to map one or more properties of the one or more data records conforming to the first version of the database schema to one or more properties of the one or more data records conforming to the second version of the database schema;
storing in the storage system the conversion rule for retrieval when performing data operations on the data records in accordance with any database schema version in a set of supported versions comprising the first version and the second version of the database schema;
determining whether the set of changes to the first version of the database schema involves a potential data loss in the one or more data records; and
in response to determining that the set of changes to the first version of the database scheme will not cause a potential data loss, translating without user intervention one or more the data records of the first version of the database schema to the second version of the database schema using the conversion rule.

12. A non-transitory computer-readable storage medium having instructions, which, when executed by a computer system, perform operations comprising:
receiving a request to make a set of changes to a first version of a database schema of a database;
in response to the receiving of the request:
creating based on the set of changes to the first version of the database schema of the database, a conversion rule for converting data records maintained by the database between the first version and a second version of the database schema, the second version resulting from an application of the set of changes to the first version of the database schema, wherein the creating the conversion rule comprises:
accessing, in a storage system, a migration stack associated with one or more data records of the data records conforming to the first version of the database schema; and
supplementing the migration stack with a version migrator for converting the one or more data records between the first version and the second version of the database schema, wherein the version migrator comprises one or more property migrators to map one or more properties of the one or more data records conforming to the first version of the database schema to one or more properties of the one or more data records conforming to the second version of the database schema;

storing in the storage system the conversion rule for retrieval when performing data operations on the data records in accordance with any database schema version in a set of supported versions comprising the first version and the second version of the database schema;

determining whether the set of changes to the first version of the database schema involves a potential data loss in the one or more data records; and in response to determining that the set of changes to the first version of the database scheme will not cause a potential data loss, translating without user intervention one or more of the data records of the first version of the database schema to the second version of the database schema using the conversion rule.

\* \* \* \* \*